Patented July 20, 1954

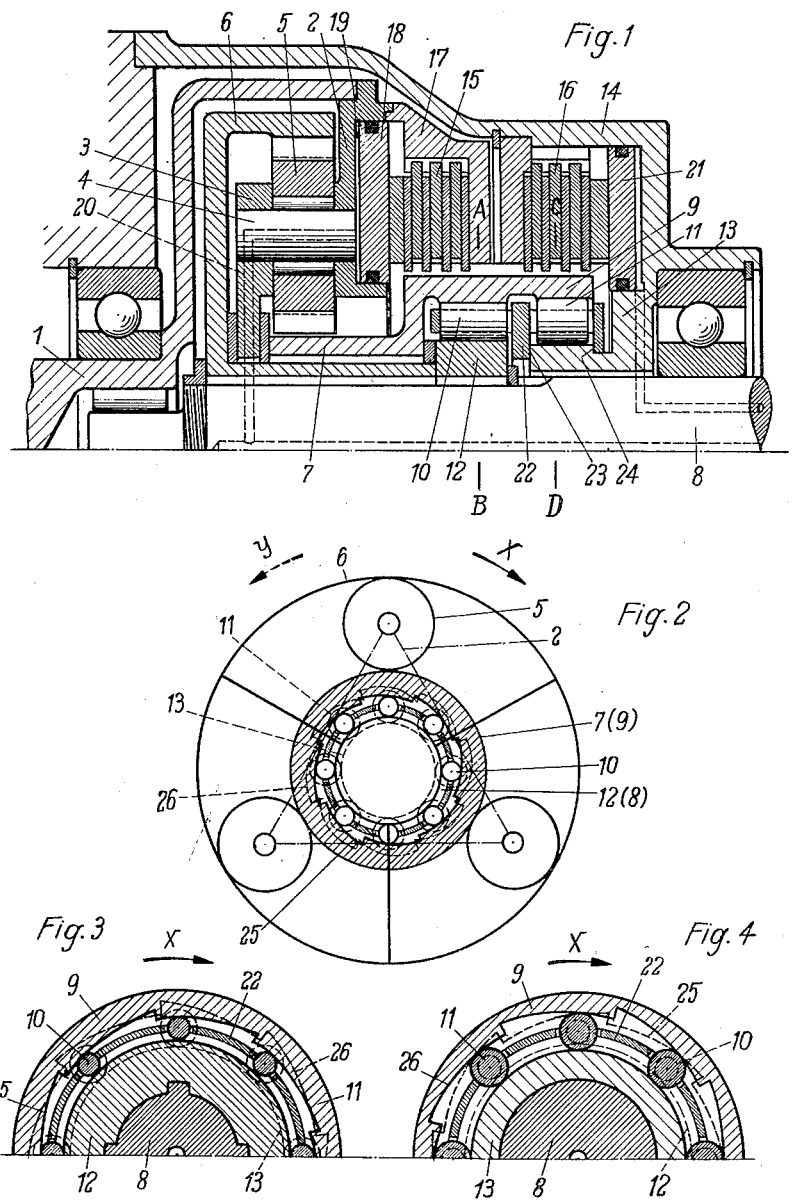

2,683,997

UNITED STATES PATENT OFFICE 2,683,997

CHANGE-SPEED GEAR WITH TWO FREEWHEELING DEVICES

Hans J. M. Forster, Harthausen a. F., Kr. Esslingen (Neckar), Germany, assignor to Daimler-Benz Aktiengesellschaft, Stuttgart-Unterturkheim, Germany Application July 19, 1950, Serial No. 174,686

11 Claims. (Cl. 74—781)

This invention relates to a change-speed gear and relates more particularly to a change-speed gear having two, with respect to each other, oppositely acting free-wheeling devices.

Objects of the present invention are preferably to provide a transmission which insures improved cooperation of the two free-wheeling devices, particularly for the purpose of preventing undesirable blocking of the transmission under certain driving conditions, for example, in case the vehicle rolls backwards while on an up-grade.

A further object of the invention is to provide a favourable and suitable arrangement of such free-wheeling devices, preferably in combination with epicyclic trains and in a manner requiring but little space.

Accordingly, an important feature of the invention consists in certain details of construction in which the grip members of the two free-wheeling devices are constrainedly coupled together in a manner whereby the grip members of the one free-wheeling device are constrainedly disengaged if the grip members of the other free-wheeling device are in gripping position. When applied to a planetary gear the arrangement is, for example, such a one that the one of the two free-wheeling devices is arranged between two gear parts through which the drive is transmitted, and the counter free-wheeling device is arranged between one gear part, through which the drive is transmitted, and a stationary part.

The invention may also be used to advantage in other transmissions, for example, in intermediate shaft gearing, or in a train of spur wheels, wherein the two free-wheeling devices in each case are arranged between rotating parts, for example, between a mutual drive shaft and another shaft each, and being effective in opposite driving direction to each other.

A mutual cage may be employed in an especially suitable and simple manner as a constrainedly connected coupling member for the grip members of the two free-wheeling devices, and the cage may be preferably in frictional contact with one of the parts to be coupled, for example, the stationary gear housing.

According to a further feature of the invention, a clutch respectively brake is arranged in parallel with each of the two free-wheeling devices. In connection with this, one of these two clutches (respectively brakes) for example, the clutch which is arranged between two rotating parts through which the drive is transmitted in main driving direction, needs to be proportioned only so large that, in the instance that the driven force becomes the driving force (for example, by the momentum of the vehicle), it drags the engine along. Hence, it may be proportioned smaller than that for the torque to be transmitted in main driving direction.

The accompanying drawing illustrates one embodiment of the invention. In the drawing—

Fig. 1 shows a two-stage planetary gear (for example, as accessory gearing for a subordinate main change-speed gear for motor vehicle drives) with free-wheeling and counter free-wheeling device coupled with each other in accordance with the invention, Fig. 2 is a schematic layout of the planetary gear, showing the arrangement of free-wheeling device and counter free-wheeling device in the transmission, Fig. 3 is a cross-section through the free-wheeling device as taken on line A—B of Fig. 1, showing the free-wheeling device in gripping position, and Fig. 4 is a cross-section through the counter free-wheeling device as taken on line C—D of Fig. 1, showing the counter free-wheeling device in gripping position and the free-wheeling device indicated by dotted lines.

The drive shaft 1, being driven from the engine, for example, by way of a main clutch, is rigidly connected to the two-piece planet carrier 2 and 3 and the pivot 4 for the planet wheels 5. The planet wheels 5 are in engagement on the one side with the outer hollow wheel 6 and on the other side with the sun wheel 7. The hub of the hollow wheel 6 is fixed upon the driven shaft 8 which, for example, leads to the main change-speed gear. The axle drive shaft of the vehicle is driven by means of the driven shaft 8, for example, by way of the main change-speed gear, containing, if necessary, also the reverse gear. The sun wheel 7 is also provided with a bell-shaped hub 9 which is effective as outer ring for the grip rollers 10 of the free-wheeling device and for the grip rollers 11 of the counter free-wheeling device. The inner ring 12 of the one way drive or free-wheeling device 10 is splined upon the driven shaft 8, whereas the inner ring 13 of the counter free-wheeling device is integral with the gear housing 14. The hub 9 of the sun wheel serves at the same time as inner plate carrier of a multiple-plate clutch 15 and likewise of a multiple-plate brake 16. The outer carrier of the first mentioned is formed by a bell-shaped part 17 which is rigidly connected to the planet carrier 2 which planet carrier is formed with one or more recesses serving as cylinders for pistons 18 whose pressure space 19, in a suitable manner, for example, by means of bores 20 in the planet carrier, can be supplied with a fluid under pressure and in turn actuates the engagement of the clutch 15. The gear housing 14, respectively a part which is integral with it, serves as outer carrier for the multiple-plate brake 16, a piston 21, which in a suitable manner may be supplied with a fluid under pressure, being used to apply the mutliple-plate brake.

The grip rollers 10 and 11 of the free-wheeling and of counter free-wheeling device respectively, of which rollers those of the counter free-wheeling device have, or may have, a larger diameter than the rollers of the other free-wheeling device, are constrainedly coupled with each other by means of a cage 22. This cage is advantageously, for example, by means of its front faces 23 and 24, in frictional contact with the fixed inner ring 13. As clearly shown in Figs. 3 and 4 the hollow hub 9 of the sun wheel, serving as outer ring, is provided with inclined faces or sloping ramps 25 for the grip rollers 10 of the free-wheeling device and with oppositely directed inclined faces or sloping ramps 26 for the grip rollers 11 of the counter free-wheeling device. These inclined faces 25 and 26 being so staggered to each other that the grip rollers 10 and 11 of the free-wheeling devices, which are constrainedly coupled with each other by the cage 22, will at no time be simultaneously in gripping position, but between the two gripping positions, on the contrary, a sufficient play in circumferential direction, provided for according to the construction, being extant between the cage 22 and the hub 9 of the sun wheel.

The manner of action of the transmission respectively shift device is the following:

Assuming that in Figs. 2 through 4 the letter $x$ represents the forward direction of rotation and the letter $y$ the backward direction of rotation of the drive shaft 1 respectively driven shaft 8. It being also assumed that not only the clutch 15 but also the brake 16 is disengaged. If in this case the engine respectively drive shaft 1 and therewith the planet carrier 2 drives the driven shaft 8 (being connected to the hollow wheel 6) and therewith the vehicle in rotational direction $x$, then the sun wheel 7 (respectively the outer ring 9), due to the resistance on the outer hollow wheel 6, attempts to overtake the driven shaft 8 respectively inner ring 12 of the free-wheeling device in rotational direction $x$. Hereby the grip rollers 10 are brought into gripping engagement, therewith establishing a direct connection between planet carrier and sun wheel, respectively drive shaft and driven shaft (Fig. 3). The drive, with regard to the housing, being released by the grip rollers 11 of the counter free-wheeling device.

If the relative driven direction is reversed—that is—if the driven force (for example, due to the momentum of the vehicle on a down grade), attempts to overtake the driving force, in which case the outer hollow wheel 6 becomes now the driving part in rotational direction $x$, then the sun wheel 7, due to the resistance of the planet carrier 2, makes the effort to rotate backwards in the direction of the arrow $y$ whereby the grip rollers 10 release their grip, whereas the grip rollers 11 of the counter free-wheeling device are pressed against the housing, their frictional grip causing the blocking of the sun wheel 7 (Fig. 4). Consequently, while the clutch 15 is disengaged, there is an automatic shift from direct drive into underdrive as soon as the driving takes place from the driven side, therefore, for example, from the momentum of the car.

If it is, nevertheless, desired to drive also in direct gear while the car is being driven by its momentum, then the clutch 15 can be engaged by conducting compressed fluid (for instance, compressed oil) into the shift cylinder 19, whereby the transmission is blocked within, the sun wheel 7 with the outer ring 9 of the free-wheeling device accordingly being carried along in forward rotational direction by the driven shaft 8 with the outer hollow wheel 6. The grip rollers 11 of the counter free-wheeling device being released from their frictional grip on the housing, whereas the grip rollers 10 remain ineffective. The clutch 15 needs to be proportioned only large enough to assure a dragging along of the engine by the momentum of the car.

In order to obtain an overdrive the brake 16 is applied. Application may be accomplished either by hand or automatically, for example, dependent upon the speed, the torque, or upon both. If necessary, application at will may be provided in addition to the selfacting application. By applying the brake 16 the sun wheel 7 respectively the outer ring 9 of the free-wheeling devices is being held fast, whereby, with driving engine respectively planet carrier 2, the outer hollow wheel 6 respectively the driven shaft 8 is driven in forward rotational direction $x$ relative to the stationary sun wheel at a ratio corresponding to the overdrive. The drive being released by the grip rollers 10, whereas the grip rollers 11 of the counter free-wheeling device are rendered ineffective due to the applied brake 16.

It is appropriate that the direct stage of the planetary gear is engaged in all the lower speeds (for example, up to the direct drive) of the transmission and likewise in the reverse. Merely in order to obtain an overdrive, for example, with engaged direct gear of the main change-speed gear, the overdrive stage of the planetary gear set is engaged by braking the sun wheel 7 (selfacting or purposely). However, if occasion arises, the overdrive stage of the planetary gear set may also be co-ordinated with each speed stage of the main change-speed gear.

If a rotation of the driven shaft 8 respectively of the outer hollow wheel 6 takes place in backward rotational direction $y$, for example, caused thereby that the car, with the forward speed of the subordinate main change-speed gear being engaged, rolls backwards on an up-grade while the engine resists such a movement, then the sun wheel 7 and therewith the outer ring 9 of the free-wheeling device are moved in forward rotational direction $x$ relative to the driven shaft 8. This movement, however, has the consequence that the grip rollers 10 are pressed against the driven shaft and sun wheel and therewith, by the frictional grip exerted, cause the blocking of the transmission within, respectively make the effort to engage the direct drive. The sun wheel with the outer ring 9 of the free-wheeling device is consequently carried along by the driven shaft 8 likewise in backward rotational direction $y$, which in turn causes that the grip rollers 11 of the counter free-wheeling device are pressed against the housing and attempt to engage the overdrive. Without the common cage 22 the drive as a whole would thereby be blocked and a backward rolling of the vehicle rendered impossible. However, the constrained positive coupling of the two sets of grip rollers by the cage 22 causes that only one of the two sets of grip rollers 10 and 11 is at a time in a gripping position, hence, while the grip rollers 10 are in gripping position, the grip rollers 11 are prevented from exerting a grip, or conversely.

By suitable construction of the grip rollers respectively by a suitable arrangement of the same respectively of the cage, the advantage may be obtained that the effort of the one or the other set of grip rollers to come into gripping position predominates. In the embodiment in accordance with the invention this is obtained, for example, by employing grip rollers of different diameters, respectively by the frictional contact between the cage and the fixed inner ring 12 of the counter free-wheeling device. While the inner ring 12 rotates in the $y$-direction, the outer ring 9

With reference to motor vehicles, these three cases mean:

1. A forward speed connected-engine drives the car in the forward direction or a rearward speed connected-engine drives the car backwards.

2. A forward speed connected, forward traveling car drives the engine forwardly or a rearward speed connected, backward traveling car drives the engine forwardly.

3. A forward speed connected, backward traveling car drives the engine backwardly or rearward speed connected, backward traveling car drives the engine backwardly.

The following chart indicates the action which takes place in the change-speed gear in accordance with the present invention for every possible condition of its operation:

|   | Clutch 15 | Brake 16 | Rollers 10 | Rollers 11 | Action |
|---|---|---|---|---|---|
| A | Free | Free | | | |
|   | 1 | Input shaft (1) drives output shaft (8) forward (Direction X). | Active | Inactive | 1 to 1 drive. |
|   | 2 | Output shaft (8) drives input shaft (1) forward (Direction X). | Inactive | Active | Shaft 1 runs slower than 8. |
|   | 3 | Output shaft (8) reverses. | Attempt to be active. | Inactive | Do. |
| B | Engaged | Free | | | |
|   | 1 | Input shaft (1) drives output shaft (8) forward. | Inactive | Inactive | 1 to 1. |
|   | 2 | Output shaft (8) drives input shaft (1) forward (Direction X). | do | do | Do. |
|   | 3 | Output shaft attempts to reverse. | do | Active | Transmission locked. |
| C | Free | Applied | | | |
|   | 1 | Input shaft (1) drives output shaft (8) forward (Direction X). | Inactive | Inactive | Overdrive. |
|   | 2 | Output shaft (8) drives input shaft (1) forward (Direction X). | do | do | Shaft 1 runs slower than 8. |
|   | 3 | Output shaft attempts to reverse. | Active | do | Transmission locked. |
| D | Engaged | Applied | Inactive | do | Transmission locked; Engine stalled; Parking. | driven by planet wheel 5 attempts to rotate in the $x$-direction because of the resistance at planet carrier 2. As soon as the outer ring 9 has rotated slightly in the $x$-direction, the grip rollers 10 lock. The outer ring 9 is then carried along slightly in the $y$-direction. Inasmuch, however, as cage 22 frictionally engages the stationary housing at 23, it falls back and causes again disengagement of grip rollers 10 thereby rendering the same ineffective. As soon as the outer ring 9 again becomes free in this manner, it again moves slightly in the $x$-direction, and the cycle begins all over again. On the whole, therefore, the outer ring 9 remains substantially stationary so that an over-drive transmission ratio is brought about, i. e., upon drive of the engine by the car, a reduction to slow speed. Of course, in practice, one will disengage the clutch in this connection as the engine after all is running forward and should not be stopped or reversed in its direction of rotation.

If desirable provision may be made for obtaining a blocking of the drive through the engagement of clutch 15 and brake 16 simultaneously at will, to thereby prevent the car from rolling backwards while on an up-grade.

In order to facilitate complete understanding of the operation of the change-speed gear in accordance with the present invention, the following table indicating the various conditions of operation is included. This table lists the three conceivable conditions for an engine which is able to deliver power only in a forward direction, namely 1. Shaft 1 drives shaft 8 in the $x$-direction.
2. Shaft 8 drives shaft 1 in the $x$-direction.
3. Shaft 8 drives shaft 1 in the $y$-direction.

It is noted that in the case B3, the gearing is completely blocked because the planet gear 6, 8, 5, 7, 9, is locked together by clutch 15 and the free wheeling device 11 does not permit rotation of rotating part 9 in the $y$-direction.

Having described only a typical preferred form and application of my invention, I do not wish to be limited or restricted to the specific form and application herein set forth, but wish to reserve to myself any modification or variations that may appear to those skilled in the art or fall within the scope of the following claims.

What I claim is:

1. In a change-speed transmission having a first rotating part, a second rotating part and a relatively stationary part; engaging means between one of said rotating parts and said relatively stationary part; a free-wheeling device between said two rotating parts including gripping rollers adapted to cause a coupling between said two parts only in one relative rotational direction, axially alongside of this free-wheeling device a further free-wheeling device being arranged between the first of said rotating parts and said relatively stationary part and including gripping rollers adapted to cause a coupling but only in such a relative rotational direction of said rotating part with regard to said relatively stationary part which is opposite to the relative rotational direction of said first rotating part with regard to said second rotating part; and means for coupling said gripping rollers with each other for constrainedly preventing the rollers of one of said sets of gripping rollers from coming into a position effecting a drive transmission if the rollers of the other set of rollers are in a position effecting a drive transmission, the grip rollers of said two free-wheeling devices having different diameters to facilitate engagement thereof.

2. In a change-speed transmission having at least two gear ratios and at least three members, two of which members are adapted to transmit power in one drive ratio and which, with at least another member, are adapted to transmit power in another gear ratio, a free-wheeling device adapted to connect the first two of said members only for one relative direction of rotation, a second free-wheeling device adapted to connect the other two members also only in one relative direction of rotation for producing a torque in the reverse direction, and means for coupling said free-wheeling devices with each other to constrainedly prevent one of said free-wheeling devices from coming into a position effecting a drive transmission, if the other one of said free-wheeling devices is in a position effecting a drive transmission, together with a clutch means for effecting said first gear ratio in both relative rotational directions, said clutch means being in parallel with said first free-wheeling device, engaging means for effecting said second gear ratio in both relative rotational directions, said engaging means being in parallel with said second free-wheeling device.

3. In a change-speed transmission, a transmission member having an annular part serving as an inwardly facing outer part, two transmission members having each an outwardly facing annular part serving as an inner annular part, a first free-wheeling device between said outer annular part and one of said two inner annular parts, axially alongside of this free-wheeling device a second free-wheeling device between said outer annular part and the other one of said two inner annular parts, said free-wheeling devices being constructed in such a manner that said second free-wheeling device effects a coupling only in a relative rotational direction of said second inner part with regard to said outer part opposite to the relative rotational direction of said first inner part with regard to said outer part in which said first-mentioned free-wheeling device effects a coupling, an engaging means in parallel with said first free-wheeling device, an engaging means in parallel with said second free-wheeling device, said engaging means being engageable in both relative rotational directions and being arranged concentrically with said free-wheeling devices and radially beyond said outer annular part, and said first-mentioned part at the same time being carrier for one portion of each of said two engaging means.

4. In a change-speed gear, the combination according to claim 3, in which said transmission member with the second-mentioned inner annular part is a relatively stationary housing part and said second mentioned engaging means couples said outer annular part with the housing as a brake.

5. In an epicyclic gear train having three rotating parts comprising outer gear, planet carrier and sun gear, the combination according to claim 37 in which said transmission member which carries said inwardly facing annular part is a rotating member of said epicyclic gear train, said transmission member with said first outwardly facing annular part being likewise a rotating member of said epicyclic gear train, and the first-mentioned engaging means between said inwardly facing annular part of the one rotating transmission member and another rotating transmission member being arranged for coupling said two transmission members, and said transmission member with said second-mentioned outwardly facing annular part being a relatively stationary part and said second-mentioned engaging means couples said inwardly facing annular part with the housing as a brake.

6. In a change-speed transmission, a housing, two shafts, three rotating gear parts consisting of an outer gear, a planet carrier and a sun gear, the planet carrier being connected with one shaft and surrounding the gear which is connected with the other shaft, the sun gear being extended by a sleeve which, on the one hand, can be coupled, via a free-wheeling device which couples only in one direction with the second shaft and with a housing via a second free-wheeling device arranged axially alongside of the first free-wheeling device and coupling only in the opposite direction, and which sleeve, on the other hand, forms a member of two couplings, in which connection the planet carrier forms the second member of the one coupling and the housing forms the second member of the other coupling.

7. In a change-speed transmission, the combination according to claim 6, in which the sun gear concentrically surrounds said second shaft and the sleeve forming its extension is provided with a somewhat larger diameter adapted to receive the two free-wheeling devices between itself and the second shaft, in which connection a hub part connected with the housing extends axially between the second free-wheeling device and the second shaft, and the said second members of the couplings are concentrically arranged alongside of each other, outside of the said sleeve.

8. In a change-speed gear, the combination according to claim 6, in which the said couplings comprise disc members.

9. In an epicyclic gear a stationary part, a first and a second rotating gear member, a free-wheeling device between said rotating gear members including means for establishing a coupling between said two members only in one relative rotational direction, a further free-wheeling device axially alongside said first-mentioned free-wheeling device between one of said gear members and said stationary part including further means for establishing a coupling therebetween only in one relative rotational direction, coupling means between said axially arranged free-wheeling devices for preventing the simultaneous coupling engagements of said free-wheeling devices whereby one of said free-wheeling devices is constrainedly prevented from coming into a position effecting a drive connection while the other one of said free-wheeling devices is in a position effecting a drive connection, clutch means between said two rotating gear members, means for engaging said clutch means in both relative rotational directions to establish a first gear ratio in both relative rotational directions, engaging means between said second gear member and said stationary part, and further means for engaging said engaging means in both rotational directions to establish a second gear ratio in both rotational directions, said engaging means being effective as a brake upon operation of said further engaging means.

10. In a change-speed gear for transmitting greater torque in the main driving direction than in the opposite direction, comprising at least three members, a free-wheeling device between two of said members including means for establishing a coupling therebetween only in one relative rotational direction and in one gear ratio, a further free-wheeling device between two other of said members including further means for establishing a coupling therebetween only in one relative rotational direction, one of said means being operative to effect a drive in the opposite direction in another gear ratio, coupling means between said free-wheeling devices for preventing the simultaneous engagements thereof whereby one of said free-wheeling devices is constrainedly prevented from coming into a position effecting a drive connection while the other one of said free-wheeling devices is in a position effecting a drive connection, engaging means in parallel with said first mentioned free-wheeling device, means for engaging said engaging means to establish one of said gear ratios, further engaging means in parallel with said second-named free-wheeling device, further means for engaging said further engaging means to establish the other of said gear ratios, the engaging means in parallel with the free-wheeling devices effecting a drive in said main direction being proportioned smaller than required for transmitting such torque in said main direction and essentially only as large as is necessary for transmitting the greatest torque in the opposite driving direction, and both said engaging means not exceeding in length corresponding free-wheeling devices in parallel therewith.

11. In a change-speed transmission having a plurality of members, a first grip member locking device between two members, axially alongside of said first grip member locking device a second grip member locking device between two further members, a cage for the grip members of said first locking device, a cage for the grip members of said second locking device, means for connecting said cages with each other to provide alternately for a locking position of only the grip members of said one locking device or the grip members of said other locking device, at least one of said two cages having friction members for bringing the same into frictional contact with one of said members.

References Cited in the file of this patent

UNITED STATES PATENTS

| Number | Name | Date |
|---|---|---|
| 2,242,276 | Vincent | May 20, 1941 |
| 2,262,747 | Banker | Nov. 18, 1941 |
| 2,263,453 | Browne | Nov. 18, 1941 |
| 2,288,594 | Neracher | July 7, 1942 |
| 2,333,115 | Neracher | Nov. 2, 1943 |
| 2,398,814 | Taylor | Apr. 23, 1946 |
| 2,481,997 | Haigh | Sept. 13, 1949 |

FOREIGN PATENTS

| Number | Country | Date |
|---|---|---|
| 618,424 | Great Britain | Feb. 22, 1949 |